J. H. GREEN.
Mowing-Machine.
No. 219,251. Patented Sept. 2, 1879.
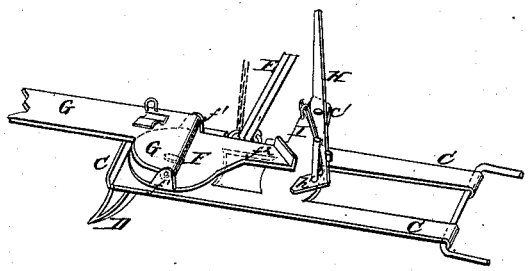
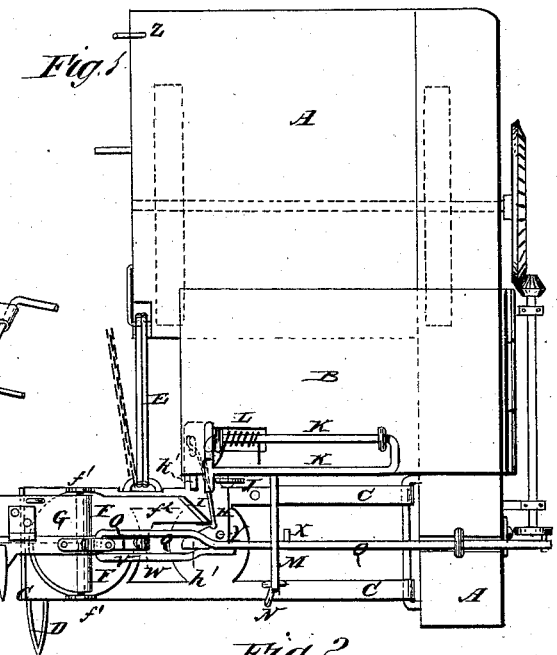
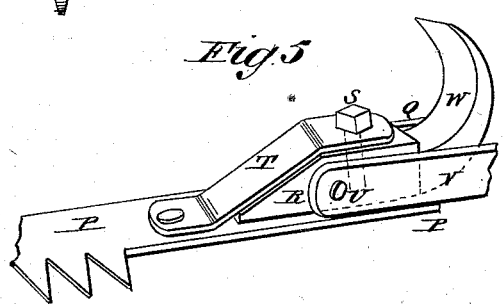
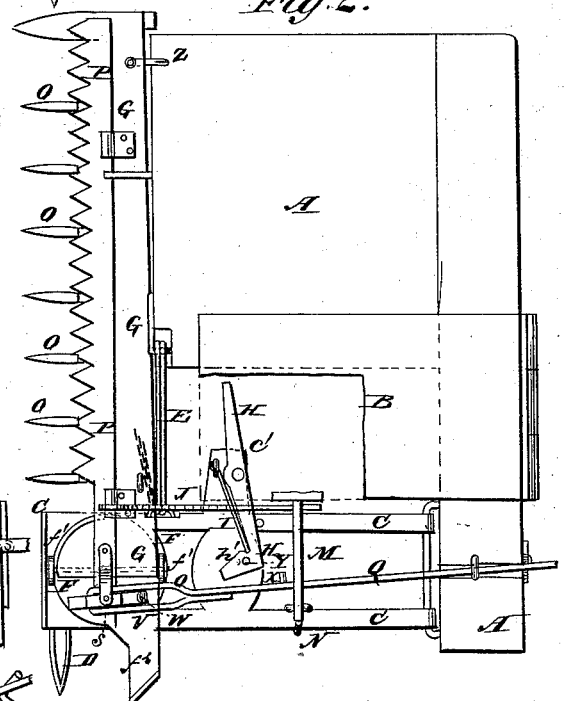
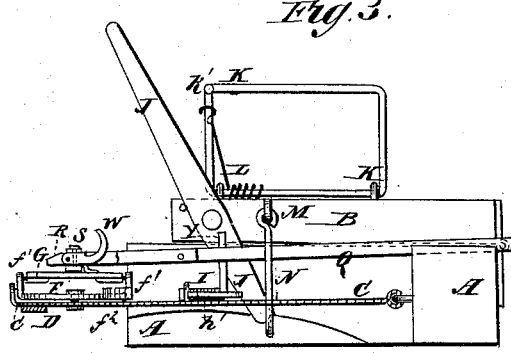
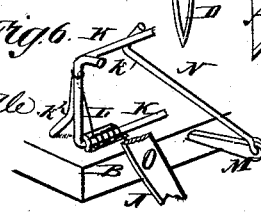
WITNESSES:
Francis M. Ardle
C. Sedgwick
INVENTOR:
J. H. Green
BY Munn & Co
ATTORNEYS.

UNITED STATES PATENT OFFICE.

JOHN H. GREEN, OF LONDONDERRY, OHIO.

IMPROVEMENT IN MOWING-MACHINES.

Specification forming part of Letters Patent No. 219,251, dated September 2, 1879; application filed April 25, 1879.

*To all whom it may concern:*

Be it known that I, JOHN HOLLAND GREEN, of Londonderry, in the county of Guernsey and State of Ohio, have invented a new and useful Improvement in Harvesters and Mowers, of which the following is a specification.

Figure 1 is a top view of a part of a mower to which my improvement has been applied, the cutter-bar being shown in position for work. Fig. 2 is the same view as Fig. 1, but showing the cutter-bar turned back. Fig. 3 is a front view of the same, arranged as shown in Fig. 2, and parts being broken away to show the construction. Fig. 4 is a perspective view of the cutter-bar coupling. Fig. 5 is a perspective view of a part of the same enlarged. Fig. 6 is a detail perspective view of a part of the foot-rest.

Similar letters of reference indicate corresponding parts.

The object of this invention is to improve the construction of harvesters and mowers in such a way that, should the driver leave, fall, or be thrown from his seat, the cutters will be thrown out of gear and the cutter-bar released, so that it will turn around parallel with the line of draft, if the machine should be drawn forward, to prevent the driver from being killed or injured should he fall in front of the cutter-bar, and render the machine less liable to receive or inflict injury should the team run away.

The invention consists in the combination of the pivoted disk provided with the lugs and the arm, the lever provided with the hook and the spring, the lever and the hinged foot-rest provided with the pin, the stop, and the spring with each other and with the hinged bar, the cutter-bar, and the seat-platform; in the combination of the arm and the hook with the hinged foot-rest and the seat-platform; in the combination of the pivoted coupling-block, the pivoting-bolt, the brace-strap, the pin, and the spring, with the sickle-bar and the connecting-rod; and in the combination of the two pins with the connecting-rod and the lever and spring, as hereinafter fully described.

A represents the frame-work of the machine. B is the platform, to which the driver's seat is attached, and which may be stationary or hinged at one end, as may be desired. C represents a bar or plate, which is hinged at one end to a bar of the frame B, and to its other end is attached a shoe, D. The bar C is supported against the draft-strain by a rod, E, the forward end of which is hinged to the rear edge of the said bar C, and its rear end is hinged to the frame A.

To the upper side of the end of the bar C is pivoted a disk or circular head, F, upon the edges of which are formed upwardly-projecting lugs $f^1$, to and between which is hinged the inner end of the cutter-bar G. With this construction the cutter-bar G can be swung back from a position at right angles with the line of draft, as shown in Fig. 1, to a position parallel with the line of draft, as shown in Fig. 2.

Upon the disk or head F is formed, or to it is rigidly attached, an arm, $f^2$, the outer end of which is inclined, as shown in Figs. 1, 2, and 4. To an arm, $c'$, formed upon the rear side of the bar C, is pivoted a lever, H, which has a hook, $h'$, formed upon its forward end to receive the end of the arm $f^2$, and thus hold the cutter-bar G against the draft-strain.

When the lever H is left free its hook end is thrown back from the arm $f^2$ by a spring, I, attached to the arm $c'$, and pressing against the forward part of the said hook-lever H. The hook end of the lever H is forced and held forward to engage with the arm $f^2$ by a lever, J, the lower part of which rests against the rear side of the said hook-lever H. The lever J is pivoted to the forward edge of the seat-platform B, and its upper end projects into such a position that it may be caught upon and held by a pin, $k^1$, attached to the foot-rest K. The foot-rest K is hinged to the platform B, and is provided with a spring, L, so arranged as to press the said foot-rest K back from the lever J when left free. The rearward movement of the foot-rest K is limited by a stop-arm, $k^2$, attached to it, and which strikes against the platform B.

With this construction the foot-rest K is held forward, holding the cutter-bar G locked in a working position, by the pressure of the driver's feet; but should the driver fall, or be thrown from his seat, so as to release the said foot-rest, or should he, from any cause, withdraw his feet from the foot-rest, the said foot-rest K will be forced back by the spring L, releasing the cutter-bar G, and allowing it to be swung back in a well-known way by disconnecting the clutch mechanism—as, for instance, in Patent No. 201,739.

To the forward edge of the platform B is attached an arm, M, to the outer end of which is pivoted the end of a rod, N, having a hook formed upon its free end.

The hook-rod N is made of such a length that its hook may be hooked upon the top bar of the foot-rest K to fasten it in place when desired.

The cutter-bar G is provided with guard-fingers O and with a sickle-bar, P, in the usual way.

Q is the pitman by which the sickle-bar P is vibrated, and which receives motion from the driving mechanism of the machine in the usual way.

To the inner end of the sickle-bar P is pivoted a coupling-block, R, by a bolt, S, the upper end of which is supported by a brace-strap, T, attached to the said sickle-bar P.

To the end of the pitman Q is attached a pin, U, which passes through a hole in the block R and through a hole in the end of the spring V. The other end of the spring V is attached to the pitman Q.

Upon the inner end of the coupling-block R is formed, or to it is attached, a curved arm, W, which, when the outer end of the cutter-bar G is raised, strikes against the disk F and pushes the sickle-bar P outward, so that the said outer end of the cutter-bar G can be raised freely.

To the side of the pitman Q is attached a pin, X, in such a position as to be struck by a pin, Y, attached to the hook-lever H, when the said hook-lever is released and is forced back by the spring I, to draw the sickle-bar inward and bring the bolt S into line with the pivot of the disk F, so that the cutter-bar G may turn back freely.

When passing from place to place the cutter-bar G may be turned back and hooked upon a hook, Z, attached to the frame A, so that the machine may be conveniently drawn along roadways and through gateways and barways.

Having thus described my invention, I claim as new and desire to secure by Letters Patent—

1. The combination, with the horizontally-swinging cutter-bar G, of the disk F, having arm $f^2$, the lever H, having hook $h'$, the spring I, the lever J, and the foot-rest K, the latter provided with pin $k^1$, stop $k^2$, and spring L, as and for the purpose specified.

2. The combination of the pivoted coupling-block R, the pivoting-bolt S, the brace-strap T, the pin U, and the spring V with the sickle-bar P and the pitman Q, substantially as herein shown and described.

3. The combination of the pins X Y with the pitman Q and the lever and spring, H I, substantially as herein shown and described.

JOHN HOLLAND GREEN.

Witnesses:
 MORRIS L. GREEN,
 ROBT. STEWART.